No. 750,102. PATENTED JAN. 19, 1904.
T. A. EDISON.
ELECTRICAL AUTOMOBILE.
APPLICATION FILED JAN. 9, 1903.
NO MODEL.
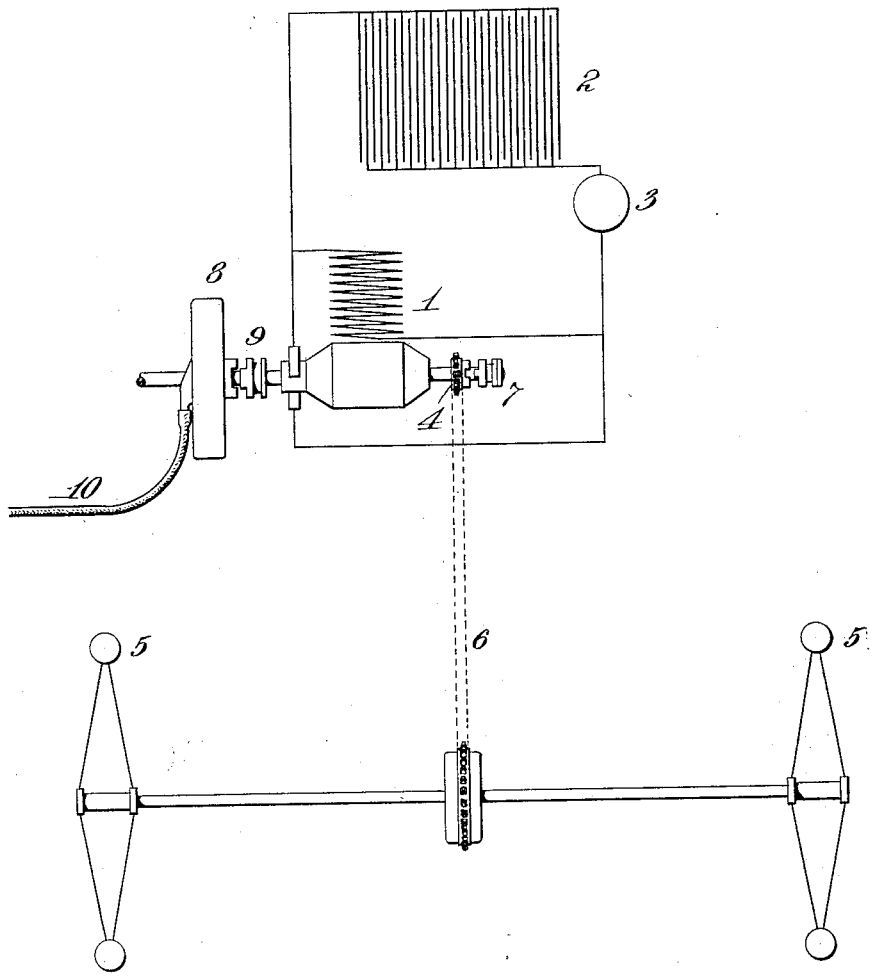
Witnesses:
Jas. F. Coleman
Jno. Robt Taylor
Inventor
Thomas A Edison
by Dyer Edmunds & Dyer
Attorneys No. 750,102.

Patented January 19, 1904.

UNITED STATES PATENT OFFICE.

THOMAS A. EDISON, OF ORANGE, NEW JERSEY.

ELECTRICAL AUTOMOBILE.

SPECIFICATION forming part of Letters Patent No. 750,102, dated January 19, 1904.

Application filed January 9, 1903. Serial No. 138,427. (No model.)

*To all whom it may concern:*

Be it known that I, THOMAS A. EDISON, a citizen of the United States, residing at Llewellyn Park, Orange, in the county of Essex and State of New Jersey, have invented a certain new and useful Improvement in Electrical Automobiles, of which the following is a specification.

My invention relates to various new and useful improvements in electric automobiles propelled by storage batteries; and my object is to provide an electric automobile in which the driving-motor may be conveniently and effectively utilized for the purpose of charging the batteries.

To this end the invention consists in providing a small steam or other elastic pressure engine, preferably of the turbine type, either connected at all times to the armature of the electric motor or adapted to be connected thereto through a suitable clutch, so that by reversing the electrical connections or by reversing the rotation of the motor-armature the electric motor will be converted into a generator for charging the batteries. A clutch connection can also be effectively utilized for disconnecting the electric motor from the driving-wheels during the charging operation, although it will be of course understood that the driving-wheels may be jacked up, so as to be driven during the charging operation.

In the drawing I illustrate a diagrammatic view of a convenient apparatus for the purpose.

The electric motor 1 is illustrated diagrammatically as being shunt-wound, although, of course, any other winding may be utilized.

2 represents the storage batteries, and 3 a suitable controller either for interposing resistance in the motor-circuit or for effecting variations in the electrical connection between the batteries and the motor for controlling the speed of the latter. On the armature-shaft of the motor is mounted a sprocket-wheel 4, which drives the vehicle-wheels 5 through a chain 6. A clutch 7 may be used for connecting or disconnecting the sprocket-wheel 4 to the armature-shaft.

8 represents a small steam or other fluid pressure engine, preferably of the turbine type, adapted to be connected to or disconnected from the motor-armature by a clutch 9. A turbine-engine is preferable on account of its extreme simplicity and lightness. A connection with the engine 8 is made through a hose-section 10 with any suitable source of steam or other fluid pressure.

While I prefer to employ means for connecting and disconnecting the driving element of the engine 8 with the motor 1, it will be understood that the clutch may be dispensed with, and particularly if a turbine-engine is used, whereby its rotating part acts as an effective fly-wheel.

In operation the motor 1 drives the carriage in the usual way, its speed being regulated by the controller 3. When the batteries become depleted, the clutch 7 may be operated to disconnect the sprocket-wheel 4 from the armature-shaft. The clutch 9, if used, connects the engine with the armature-shaft, and the supply-hose 10 is led to the boiler or other source of steam-supply. By now operating the engine 8 to reverse the rotation of the armature-shaft the motor 1 will be converted into a generator to recharge the batteries 2. By means of my present invention the radius of action of electric automobiles is very greatly increased, since even in small towns it is possible to secure a supply of steam where the electric current is not used. When the engine 8 is of the turbine type, it adds but little weight and bulk to the entire apparatus.

Having now described my invention, what I claim as new, and desire to secure by Letters Patent, is as follows:

1. In an electric automobile, the combination with the driving-motor and the storage batteries, of a separate fluid-pressure engine connected with the armature-shaft of the motor for operating the latter as a generator for recharging the batteries, and a flexible connection with said engine for supplying fluid-pressure thereto, substantially as and for the purposes set forth.

2. In an electric automobile, the combination with the driving-motor and the storage batteries, of a separate rotary fluid-pressure engine connected with the armature-shaft of the motor for operating the latter as a generator for recharging the batteries, and a flexible connection with said engine for supplying fluid-pressure thereto, substantially as and for the purposes set forth.

3. In an electric automobile, the combination with the driving-motor and the storage batteries, of a separate turbine fluid-pressure engine connected with the armature-shaft of the motor for operating the latter as a generator for recharging the batteries, and a flexible connection with said engine for supplying fluid-pressure thereto, substantially as and for the purposes set forth.

4. In an electric automobile, the combination with the operating-motor and batteries, of a fluid-pressure engine normally disconnected from the armature-shaft of the motor but adapted to be connected therewith for operating the motor as a generator for recharging the batteries, and a flexible connection with said engine for supplying fluid-pressure thereto, substantially as and for the purposes set forth.

5. In an electric automobile, the combination with the operating-motor and batteries, of a rotary fluid-pressure engine normally disconnected from the armature-shaft of the motor but adapted to be connected therewith for operating the motor as a generator for recharging the batteries, and a flexible connection with said engine for supplying fluid-pressure thereto, substantially as and for the purposes set forth.

6. In an electric automobile, the combination with the operating-motor and batteries, of a fluid-pressure turbine-engine normally disconnected from the armature-shaft of the motor but adapted to be connected therewith for operating the motor as a generator for recharging the batteries, and a flexible connection with said engine for supplying the fluid-pressure thereto, substantially as and for the purposes set forth.

7. In an electric automobile, the combination with the motor, batteries and connections between the motor and the driving-wheels, of a fluid-pressure engine connected to the armature-shaft for operating the motor as a generator, and means for disconnecting the armature-shaft from the driving-wheels, and a flexible connection with said engine for supplying fluid-pressure thereto, substantially as and for the purposes set forth.

8. In an electric automobile, the combination with the driving-motor, batteries and connections between the motor and driving-wheels, of a fluid-pressure engine normally disconnected from the armature-shaft but adapted to be connected therewith to operate the motor as a generator, and a flexible connection with said engine for supplying the fluid-pressure thereto, substantially as and for the purposes set forth.

This specification signed and witnessed this 18th day of December, 1902.

THOMAS A. EDISON.

Witnesses:
 FRANK L. DYER,
 JNO. ROBT. TAYLOR.